United States Patent
Tiagi et al.

(10) Patent No.: US 10,742,673 B2
(45) Date of Patent: Aug. 11, 2020

(54) TRACKING THE DYNAMICS OF APPLICATION-CENTRIC CLUSTERS IN A VIRTUALIZED DATACENTER

(71) Applicant: Nicira, Inc., Palo Alto, CA (US)

(72) Inventors: Alok Tiagi, Palo Alto, CA (US); Jayant Jain, Palo Alto, CA (US); Anirban Sengupta, Saratoga, CA (US); Subrahmanyam Manuguri, San Jose, CA (US); Vedant Saran, Campbell, CA (US)

(73) Assignee: NICIRA, INC., Palo Alto, CA (US)

( * ) Notice: Subject to any disclaimer, the term of this patent is extended or adjusted under 35 U.S.C. 154(b) by 277 days.

(21) Appl. No.: 15/835,865

(22) Filed: Dec. 8, 2017

(65) Prior Publication Data

US 2019/0182276 A1    Jun. 13, 2019

(51) Int. Cl.
*H04L 29/06* (2006.01)
*H04L 12/813* (2013.01)
(Continued)

(52) U.S. Cl.
CPC ........ *H04L 63/1425* (2013.01); *H04L 43/062* (2013.01); *H04L 43/067* (2013.01);
(Continued)

(58) Field of Classification Search
CPC ..... H04L 43/062; H04L 43/067; H04L 47/20; H04L 47/2441; H04L 63/0227;
(Continued)

(56) References Cited

U.S. PATENT DOCUMENTS 8,605,655 B1   12/2013   Sahai et al.
9,215,213 B2   12/2015   Bansal et al.
(Continued)

OTHER PUBLICATIONS

David Mimno, Bayesian checking for topic models, 2011, Conference on Empirical Methods in Natural Language Processing, pp. 227-237 (Year: 2011).*

(Continued)

*Primary Examiner* — Thanhnga B Truong
(74) *Attorney, Agent, or Firm* — Adeli LLP

(57) ABSTRACT

For a managed network including multiple nodes providing multiple services and executing multiple applications some embodiments provide a method for generating groupings of network addresses associated with different applications or services. The method analyzes network traffic patterns using a probabilistic topic modeling algorithm to generate the groupings of network addresses. In some embodiments, data is collected and analyzed periodically. A network administrator defines the granularity of the time stamps in some embodiments to monitor changes in network traffic patterns over time for each network address or node and/or for the network as a whole. For each network address or node, a probability distribution over the topics at a given time is stored in some embodiments. The stored distributions are then used to determine a divergence over time of the application or service provided by the network address or node. Additionally, the stored distributions can be used to detect anomalous behavior.

20 Claims, 12 Drawing Sheets

(51) Int. Cl.
*H04L 12/26* (2006.01)
*H04L 12/851* (2013.01)

(52) U.S. Cl.
CPC .......... *H04L 47/20* (2013.01); *H04L 47/2441* (2013.01); *H04L 63/0227* (2013.01); *H04L 63/101* (2013.01); *H04L 63/20* (2013.01); *H04L 63/0272* (2013.01)

(58) Field of Classification Search
CPC ............... H04L 63/0272; H04L 63/101; H04L 63/1425; H04L 63/20; H04L 12/56; H04L 12/26; H04L 12/813; H04L 12/851; G06F 15/173; G06F 15/177; G06F 15/16
See application file for complete search history.

(56) References Cited

U.S. PATENT DOCUMENTS

| | | |
|---|---|---|
| 9,438,560 B2 | 9/2016 | Mohanty et al. |
| 9,438,634 B1 | 9/2016 | Ross et al. |
| 9,467,476 B1 | 10/2016 | Shieh et al. |
| 9,787,641 B2 | 10/2017 | Bansal et al. |
| 10,298,619 B2 | 5/2019 | Nimmagadda et al. |
| 10,419,321 B2 | 9/2019 | Raman et al. |
| 2003/0120955 A1 | 6/2003 | Bertal et al. |
| 2005/0262554 A1 | 11/2005 | Brooks et al. |
| 2007/0011734 A1 | 1/2007 | Balakrishnan et al. |
| 2008/0037423 A1 | 2/2008 | Singh et al. |
| 2008/0059596 A1 | 3/2008 | Ogawa |
| 2008/0196102 A1 | 8/2008 | Roesch |
| 2008/0267186 A1 | 10/2008 | Boukis et al. |
| 2008/0282335 A1 | 11/2008 | Abzarian et al. |
| 2009/0300341 A1 | 12/2009 | Buehler et al. |
| 2010/0106764 A1 | 4/2010 | Chadwick et al. |
| 2010/0107085 A1 | 4/2010 | Chadwick et al. |
| 2010/0325199 A1 | 12/2010 | Park et al. |
| 2010/0332262 A1 | 12/2010 | Horvitz et al. |
| 2012/0131591 A1 | 5/2012 | Moorthi et al. |
| 2012/0226808 A1 | 9/2012 | Morgan |
| 2013/0067090 A1 | 3/2013 | Batrouni et al. |
| 2013/0185413 A1 | 7/2013 | Beaty et al. |
| 2015/0135003 A1 | 5/2015 | Cota-Robles et al. |
| 2015/0236935 A1* | 8/2015 | Bassett ............... H04L 63/1408 709/224 |
| 2015/0358391 A1 | 12/2015 | Moon et al. |
| 2016/0112443 A1* | 4/2016 | Grossman ........... H04L 63/1416 726/23 |
| 2016/0156591 A1 | 6/2016 | Zhou et al. |
| 2016/0191463 A1 | 6/2016 | Mohanty et al. |
| 2016/0294987 A1 | 10/2016 | Tian et al. |
| 2016/0350683 A1 | 12/2016 | Bester et al. |
| 2017/0005986 A1 | 1/2017 | Bansal et al. |
| 2017/0019487 A1* | 1/2017 | Maheshwari ........... H04L 67/16 |
| 2017/0078168 A1 | 3/2017 | Harris et al. |
| 2017/0207968 A1 | 7/2017 | Eicken et al. |
| 2017/0293994 A1 | 10/2017 | Li et al. |
| 2017/0324632 A1 | 11/2017 | Arora |
| 2017/0359217 A1 | 12/2017 | Ahuja et al. |
| 2017/0374102 A1 | 12/2017 | Woolward |
| 2017/0374106 A1 | 12/2017 | Hamou et al. |
| 2018/0007127 A1 | 1/2018 | Salapura et al. |
| 2018/0027080 A1 | 1/2018 | Yang et al. |
| 2018/0032399 A1 | 2/2018 | Johnson et al. |
| 2018/0034856 A1 | 2/2018 | Mallya |
| 2018/0041578 A1 | 2/2018 | Lee et al. |
| 2018/0048623 A1 | 2/2018 | Bansal et al. |
| 2018/0077119 A1 | 3/2018 | Fields et al. |
| 2018/0077189 A1 | 3/2018 | Doppke et al. |
| 2018/0084034 A1 | 3/2018 | Netto et al. |
| 2018/0088964 A1 | 3/2018 | Hussain et al. |
| 2018/0101371 A1 | 4/2018 | Flanakin et al. |
| 2018/0123907 A1 | 5/2018 | Raman et al. |
| 2018/0123939 A1 | 5/2018 | Raman et al. |
| 2018/0145999 A1 | 5/2018 | Ertugrul et al. |
| 2018/0167405 A1 | 6/2018 | Comay et al. |
| 2018/0176102 A1 | 6/2018 | Bansal et al. |
| 2018/0176252 A1 | 6/2018 | Nimmagadda et al. |
| 2018/0176261 A1 | 6/2018 | Bansal et al. |
| 2019/0180141 A1 | 6/2019 | Tiagi et al. |
| 2019/0230064 A1 | 7/2019 | Soman |

OTHER PUBLICATIONS

David M. Blei, Probabilistic Topic Models, 2012, Communications of the ACM, vol. 55, No. 4, pp. 77-84 (Year: 2012).*

Mark Steyvers, Probabilistic Topic Models, 2014, Taylor and Francis Group, ISBN 9781138004191, Chapter 21, pp. 427-448 (Year: 2014).*

El-Atainy, Adel, et al., "Policy Segmentation for Intelligent Firewall Testing," 1st IEEE ICNP Workshop on Secure Network Protocols, Nov. 6, 2005, 6 pages, IEEE, Boston, MA, USA.

Anwar, Manwish, "Virtual Firewalling for Migrating Virtual Machines in Cloud Computing," 2013 5th International Conference on Information and Communication Technologies, Dec. 14-15, 2013, 11 pages, IEEE, Karachi, Pakistan.

Maheshwari, Ritu, et al., "Private Virtual Cloud Infrastructure Modelling using 'VCPHCF-RTT' Security Agent," 2018 4th International Conference on Computing Communication and Automation (ICCCA), Dec. 14-15, 2018, 5 pages, IEEE, Greater Noida, India.

* cited by examiner

Flow Records 205

| Flow Data Fields 210 | SrcIP | DestIP | Bytes | Packets | Src Port | Duration | Timestamp | Protocol | Direction |
|---|---|---|---|---|---|---|---|---|---|
| Flow 201A | 192.168.1.100 | 192.168.2.20 | 2354267 | 1523 | 80 | 62340 | 1256953732 | TCP | Out |
| Flow 201B | 192.168.1.110 | 192.168.2.20 | 3367 | 45 | 20 | 1274 | 1256955893 | UDP | Out |
| Flow 201C | 192.168.1.100 | 192.168.2.40 | 2358374 | 1514 | 80 | 62520 | 125692689 | TCP | Out |
| Flow 201D | 192.168.1.110 | 192.168.3.10 | 2258264 | 1516 | 20 | 62440 | 1256958937 | TCP | Out |
| Flow 201E | 192.168.1.110 | 192.168.2.20 | 3367 | 45 | 20 | 1318 | 1257255893 | UDP | Out |
| Flow 201F | 192.168.1.100 | 192.168.3.129 | 2298374 | 1498 | 80 | 62320 | 125683686 | TCP | Out |

Word List 215

| Word Fields 220 | DestIP_subnet | Bytes_Bin | Packets_Bin | Src Port | Duration Bin | Time period (Hrs) |
|---|---|---|---|---|---|---|
| Word 202A | 192.168.2.0/24 | 6 (1M-10M) | 3 (1K-10K) | 80 | 4 (10K-100K) | 1 |
| Word 202B | 192.168.2.0/24 | 3 (1K-10K) | 1 (10-100) | 20 | 3 (1K-10K) | 2 |
| Word 202C | 192.168.3.0/24 | 6 (1M-10M) | 3 (1K-10K) | 20 | 10K-4 (10K-100K) | 2 |
| Word 202D | 192.168.3.0/24 | 6 (1M-10M) | 3 (1K-10K) | 80 | 10K-4 (10K-100K) | 1 |

Word List 225

| Word Fields 230 | Bytes_Bin | Packets_Bin | Src Port | Duration_Bin |
|---|---|---|---|---|
| Word 203A | 6 (1M-10M) | 3 (1K-10K) | 80 | 4 (10K-100K) |
| Word 203B | 3 (1K-10K) | 1 (10-100) | 20 | 3 (1K-10K) |
| Word 203C | 6 (1M-10M) | 3 (1K-10K) | 20 | 4 (10K-100K) |
| Word 203D | 6 (1M-10M) | 3 (1K-10K) | 80 | 4 (10K-100K) |

*Figure 2*

Word Frequency Table 305

| Document number / Word number | Doc 1 192.168.1.100 | Doc 2 192.168.1.110 |
|---|---|---|
| Word 1 | 2 | 0 |
| Word 2 | 0 | 2 |
| Word 3 | 0 | 1 |
| Word 4 | 1 | 0 |

Word Frequency Table 310

| Document number / Word number | Doc 1 | Doc 2 | Doc 3 | Doc4 | ⋯ | Doc M |
|---|---|---|---|---|---|---|
| Word 1 | 1203 | 2030 | 0 | 100 | ⋯ | 125 |
| Word 2 | 0 | 240 | 1587 | 2490 | ⋯ | 4923 |
| Word 3 | 1103 | 2476 | 0 | 350 | ⋯ | 57 |
| Word 4 | 163 | 364 | 737 | 0 | ⋯ | 0 |
| ⋮ | ⋮ | ⋮ | ⋮ | ⋮ | | ⋮ |
| Word V | 0 | 56 | 3582 | 1839 | ⋯ | 0 |

*Figure 3*

Initial Random Word Probability Table 410A

| Word number \ Topic number | Topic 1 | Topic 2 | Topic 3 | Topic 4 | ... | Topic K |
|---|---|---|---|---|---|---|
| Word 1 | .03 | .03 | .03 | .03 | ... | .03 |
| Word 2 | .03 | .02 | .03 | .004 | ... | .02 |
| Word 3 | .03 | .002 | .02 | .03 | ... | .57 |
| Word 4 | .02 | .03 | .03 | .02 | ... | .001 |
| ⋮ | ⋮ | ⋮ | ⋮ | ⋮ | | ⋮ |
| Word V | .01 | .02 | .03 | .02 | ... | .05 |

Initial Random Topic Probability Table 420A

| Topic number \ Document number | Doc 1 | Doc 2 | Doc 3 | Doc 4 | ... | Doc M |
|---|---|---|---|---|---|---|
| Topic 1 | .03 | .05 | 0 | 0 | ... | .03 |
| Topic 2 | .1 | .11 | .03 | .04 | ... | .1 |
| Topic 3 | .3 | .03 | .02 | .03 | ... | 0 |
| Topic 4 | .05 | .03 | .5 | .05 | ... | .02 |
| ⋮ | ⋮ | ⋮ | ⋮ | ⋮ | | ⋮ |
| Topic K | .05 | 0 | .3 | .05 | ... | 0 |

*Figure 4A*

Final Word Probability Table 410B

| Word number \ Topic number | Topic 1 | Topic 2 | Topic 3 | Topic 4 | ... | Topic K |
|---|---|---|---|---|---|---|
| Word 1 | .01 | .1 | 0 | .05 | ... | .15 |
| Word 2 | 0 | .4 | .23 | .004 | ... | .26 |
| Word 3 | .14 | .002 | .16 | .03 | ... | .57 |
| Word 4 | .3 | .09 | .03 | .1 | ... | .001 |
| ... | ... | ... | ... | ... | ... | ... |
| Word V | .01 | .007 | .001 | .5 | ... | .05 |

Final Topic Probability Table 420B

| Topic number \ Document number | Doc 1 | Doc 2 | Doc 3 | Doc4 | ... | Doc M |
|---|---|---|---|---|---|---|
| Topic 1 | .4 | .42 | 0 | 0 | ... | 0 |
| Topic 2 | .1 | .11 | .03 | .04 | ... | .1 |
| Topic 3 | .3 | .28 | .02 | .01 | ... | 0 |
| Topic 4 | .05 | .03 | .5 | .45 | ... | .2 |
| ... | ... | ... | ... | ... | ... | ... |
| Topic K | 0 | 0 | .3 | .35 | ... | 0 |

*Figure 4B*

Temporal Topic Probability Table 1010

| Word number \ Document number | Doc 1 time 1 | Doc 1 time 2 | Doc 1 time 3 | Doc 1 time 4 | ... | Doc 1 time J |
|---|---|---|---|---|---|---|
| Topic 1 | .4 | .42 | .38 | 0 | ... | .4 |
| Topic 2 | .1 | .11 | .12 | .04 | ... | .1 |
| Topic 3 | .3 | .28 | .3 | .01 | ... | .29 |
| Topic 4 | .05 | .03 | .05 | .45 | ... | .02 |
| ⋮ | ⋮ | ⋮ | ⋮ | ⋮ | | ⋮ |
| Topic K | 0 | 0 | .01 | .35 | ... | 0 |

TRACKING THE DYNAMICS OF APPLICATION-CENTRIC CLUSTERS IN A VIRTUALIZED DATACENTER

BACKGROUND

Clustering nodes performing similar functions for security policy enforcement within a datacenter is a hard problem. Network administrators today either group nodes together using existing knowledge of the applications running on the nodes, by the tier (Web, App, or DB tier), or by grouping together nodes on the basis of application or service ports open on them. These methods require domain knowledge, knowledge of the network topology, and that the administrator keeps track of all new node and application deployments. As new applications and nodes are added, they have to be moved to an existing cluster of nodes, to enforce security policies.

The difficulty is only compounded by the fact that clusters are not inherently static. Once network administrators have identified a cluster, there is little guarantee that its constituent nodes will continue to behave in a similar way, or that its future traffic patterns will match its past patterns. Thus, when applications and nodes are constantly being added and removed, nodes are shifting between clusters, and the definition of a cluster itself is dynamic, keeping track of clusters becomes time-consuming and tedious.

BRIEF SUMMARY

For a managed network including multiple nodes providing multiple services and executing multiple applications some embodiments provide a method for generating groupings of network addresses associated with different applications or services. The method analyzes network traffic patterns to generate the groupings of network addresses. Network traffic patterns are related to the different flows in the network. The method analyzes information about the different flows such as some combination of the network addresses in the network that are a source or destination of the flow, the source or destination port, the number of packets in each flow, the number of bytes exchanged during the life of the flow, a start time of a flow, the direction of a flow, the protocol (e.g., TCP or UDP), and the duration of the flow. In some embodiments, the information is collected as part of an internet protocol flow information export (IPFIX) operation or a tcpdump operation.

The information about each flow is used to generate a single data point ("word") associated with at least one network address ("document") in the managed network that is a source or destination of the flow. In some embodiments, the information is processed to bin certain attributes of a flow such as the number of packets in each flow, the number of bytes exchanged during the life of the flow, and the duration of the flow to generate the data point. Additional information about the time the flow occurred is also collected in some embodiments to provide the ability to analyze the data based on time intervals. Over time, a corpus of data points associated with network addresses or nodes is developed. This corpus of data points in some embodiments is organized by "document" (e.g., network address or node).

A probabilistic topic modeling algorithm (e.g., latent Dirichlet allocation (LDA)) is used to analyze the corpus to identify the composition of a number of topics contained in the corpus. In some embodiments, the number of topics is set by a user. The topics in some embodiments are defined by a probability distribution over the "words" (e.g., information about an individual flow) in the corpus. Each topic in some embodiments represents a traffic pattern that the probabilistic topic modeling algorithm has inferred from the corpus. These inferred traffic patterns may represent the traffic pattern associated with a particular application or service or a subset of traffic associated with the particular application or service. The distribution of topics within the individual "documents" (e.g., network addresses) is also calculated as part of the probabilistic topic modeling algorithm.

Once individual network addresses or nodes are associated with probability distributions over the topics, a clustering algorithm (e.g., k-means clustering) can be applied to identify clusters or groups of network addresses or nodes sharing similar probability distribution over the topics. It is expected that network addresses or nodes (e.g., servers) running the same application will show similar network traffic patterns and therefore have similar probability distribution over the topics. These clusters in some embodiments are presented to a network administrator for the network administrator to use in determining which policies (e.g., security policies, firewall policies, etc.) to apply to each cluster of network addresses or nodes and whether certain nodes have been placed in an incorrect cluster. In some embodiments, once a cluster has been identified and a policy applied to the cluster, new network addresses or nodes that are identified as belonging to the cluster have the same policy applied automatically.

In some embodiments, data is collected and analyzed periodically. The "documents" defined for some embodiments using periodical analysis include both network address and time stamp. A network administrator defines the granularity of the time stamps in some embodiments to monitor changes in network traffic patterns over time for each network address or node and/or for the network as a whole. In some embodiments, cluster identification depends on a subset of the corpus (e.g., "documents" having either a current time stamp or an immediately prior time stamp).

The resulting probability distribution over the topics for each network address or node is used in some embodiments to update cluster membership or, for newly added network addresses or nodes, to assign the new network address or node to an existing cluster. For each network address or node, a probability distribution over the topics at a given time is stored in some embodiments. The stored distributions are then used to determine a divergence over time of the application or service provided by the network address or node (as indicated by the probability distribution over topics). Additionally, the stored distributions can be used to detect anomalous behavior.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and the Drawings is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 2 conceptually illustrates a set of flow records and possible sets of words that can be generated based on the flow records.

FIG. 3 conceptually illustrates two word-frequency tables for a set of documents.

FIGS. 4A-B conceptually illustrate initial and final probability distributions of words in topics and topics in documents.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

For a managed network including multiple nodes providing multiple services and executing multiple applications some embodiments provide a method for generating groupings of network addresses associated with different applications or services. The method analyzes network traffic patterns to generate the groupings of network addresses. Network traffic patterns are related to the different flows in the network. The method analyzes information about the different flows such as some combination of the network addresses in the network that are a source or destination of the flow, the source or destination port, the number of packets in each flow, the number of bytes exchanged during the life of the flow, a start time of a flow, the direction of a flow, the protocol (e.g., TCP or UDP), and the duration of the flow.

As used in this document, the term flow, traffic flow, or data message flow refers to a set of packets or data messages exchanged between a source network address and a destination network address that share identifying characteristics. In some embodiments, the shared characteristics are an n-tuple (e.g., a 5-tuple made up of header fields such as source Internet protocol (IP) address, source port number, destination IP address, destination port number, and protocol). A flow consists of all packets in a specific transport connection in some embodiments.

As used in this document, the term data packet, packet, data message, or message refers to a collection of bits in a particular format sent across a network. It should be understood that the term data packet, packet, data message, or message may be used herein to refer to various formatted collections of bits that may be sent across a network, such as Ethernet frames, IP packets, TCP segments, UDP datagrams, etc. While the examples below refer to data packets, packets, data messages, or messages, it should be understood that the invention should not be limited to any specific format or type of data message. Also, as used in this document, references to L2, L3, L4, and L7 layers (or layer 2, layer 3, layer 4, layer 7) are references to the second data link layer, the third network layer, the fourth transport layer, and the seventh application layer of the OSI (Open System Interconnection) layer model, respectively.

Figure 1:
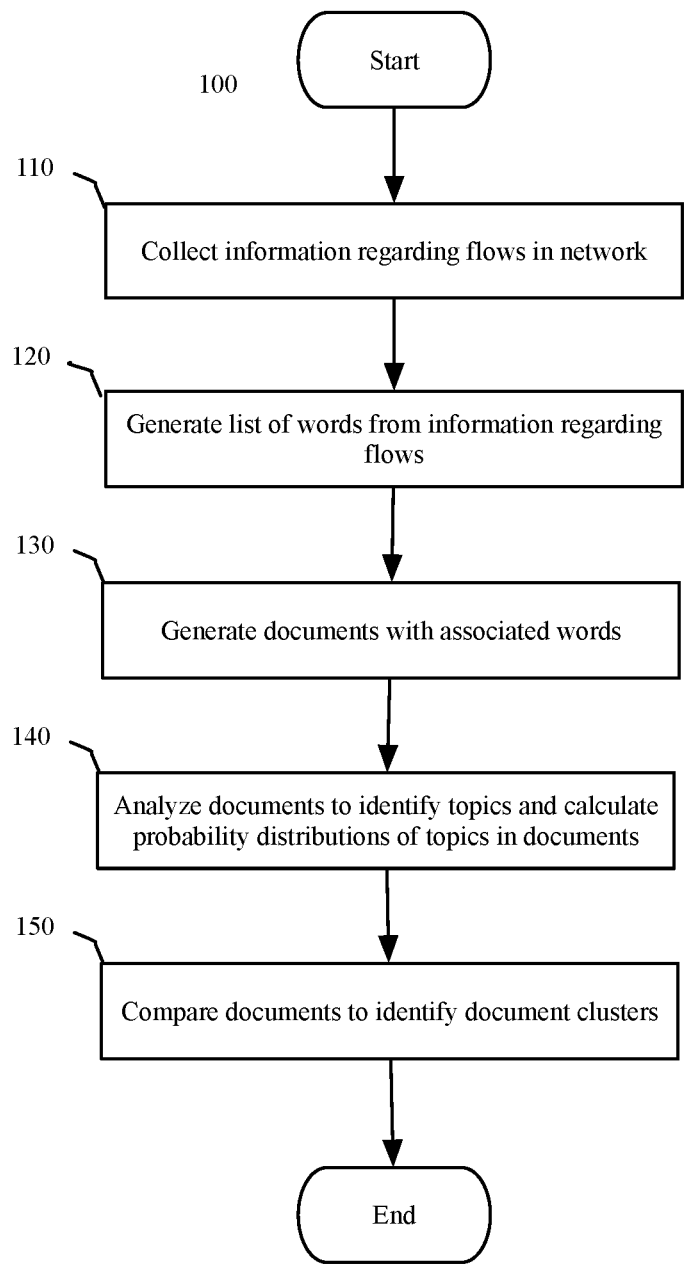
FIG. 1 conceptually illustrates a process for identifying clusters of network addresses exhibiting similar traffic patterns.

FIG. 1 conceptually illustrates a process 100 for identifying clusters of network addresses exhibiting similar traffic patterns. The process collects (at 110) information regarding flows involving nodes or network addresses in a computer network. In some embodiments, the information is collected as part of an internet protocol flow information export (IPFIX) operation or a tcpdump operation. The information included in some embodiments includes some combination of source network (e.g., IP) address, destination network address, source port, destination port, the number of packets in each flow, the number of bytes exchanged during the life of the flow, a start time of a flow, and the duration of the flow. One of ordinary skill in the art will appreciate that other methods of collecting information regarding traffic flows also provide the data necessary to perform the method.

The process than generates (at 120) a set of data points ("words") associated with at least one network address or node ("document") in the managed network that is a source or destination of the flow. The information about each flow is used to generate a single data point ("word") associated with at least one network address or node ("document") in the managed network that is a source or destination of the flow. In some embodiments, the information is processed to bin certain attributes of a flow such as the number of packets in each flow, the number of bytes exchanged during the life of the flow, and the duration of the flow to generate the data point. The bins may be organized in any way that is useful such as bins of equal size (e.g., each 10000 bytes or 100 packets exchanged is a new bin) or logarithmic/exponential bins (e.g., bins broken up in powers of ten, $[10^0\text{-}10^1)$, $[10^1\text{-}10^2)$, $[10^2\text{-}10^3)$, etc.). A person of ordinary skill in the art would recognize that other types of bin distributions may be useful depending on the situation. Additional information about the time the flow occurred is also collected in some embodiments to provide the ability to analyze the data based on time intervals. Details about flow information collection and word generation are provided in FIG. 2.

FIG. 2 conceptually illustrates a set of flow records (205) and possible sets of words (215 and 225) that are generated based on the flow records in different embodiments. FIG. 2 shows a set of flow records 205 that includes six flows, flows 201A-F, for which data relating to the flow data fields 210 is collected. Flow data fields 210 include a source IP address, destination IP address, bytes exchanged, packets exchanged, source port, duration of the flow in milliseconds, a timestamp (e.g., a timestamp when the first packet of the flow is received in UNIX time), the protocol, and a direction (e.g., to ("in") or from ("out") the IP address that defines a document). For the sake of simplifying the example, all flow records are from the IP addresses of interest. Additional or alternative fields in some embodiments include a destination port and other relevant fields given the context. One of ordinary skill in the art will appreciate that other embodiments collect only a subset of the flow data fields 210.

Once data regarding flows has been collected, words are generated. FIG. 2 illustrates word lists 215 and 225 as two possible word lists that can be generated based on flows 201A-F. To generate each of the word lists 215 and 225, the data (except for the source port) for each flow is organized into summarized data (i.e., subnets of IP addresses; logarithmic bins for each of bytes, packets, and duration; and hours for the time stamp). As noted above the summarization in different embodiments may be done differently. For example, timestamps may be organized by day, or to distinguish weekdays from weekends. Additionally, the same data in some embodiments is summarized differently for independent analyses of the flow traffic. For example, a network administrator may wish to identify clusters over all time and ignore the timestamp data entirely, while at the same time analyzing how the clusters or network traffic relating to a particular network address change over the course of multiple days with timestamps summarized into 6-hour blocks.

Word list 215 illustrates a set of words generated using a set of word fields 220 that includes a destination IP subnet (assuming a /24 subnet mask), the number of bytes, packets, and duration of the flow in milliseconds binned using logarithmic scales, the source port, and an hour during which the flow originated. Word list 225 uses a similar set of word fields 230 that omits the destination IP subnet and hour fields as irrelevant, for example if a user is not interested in time behavior and is concerned only with the files that a source IP address is serving but not the destinations that they are being served to. In each of word lists 215 and 225, four words are identified that summarize the data collected for the flows. As additional data is collected more words are expected to be identified.

Returning to FIG. 1, the process generates (at 130) a set of network addresses or nodes ("documents") and their associated summarized data flows ("words") from the collected data. For each flow, the collected flow information indicates, in either a source or destination network address, a network address or node that defines a "document" which is then associated with the word that the flow information defines. As the data for the individual flows is analyzed word counts per document are developed that will be used to identify topics and eventually clusters of related addresses or nodes. Over time, a corpus of data points ("words") associated with network addresses or nodes is developed. This corpus of data points in some embodiments is organized by "document" (e.g., network address or node). FIG. 3 shows an example of a word count per document for the flows identified in FIG. 2 and an example of a table for a set of M documents over a larger number of flows from which V words have been identified.

FIG. 3 conceptually illustrates two word-frequency tables for a set of documents, one (305) for the reduced set of flows depicted in FIG. 2 and one (310) an example of a full table based on a larger set of flows. Word frequency table 305 represents a word frequency table for the six flows depicted in FIG. 2. IP address 192.168.1.100 is identified as document 1 and is associated with word 1 with frequency 2 and word 4 with frequency 1, while IP address 192.168.1.110 is identified as document 2 and is associated with word 2 with frequency 2 and word 3 with frequency 1. As more data is received, eventually a word frequency table such as word frequency table 310 is generated for M identified documents (e.g., network addresses or nodes) and V unique words (e.g., summarized flow characteristics).

Returning to FIG. 1, the process analyzes (at 140) the documents (or the word frequency table) to calculate probability distributions of topics in the documents. A probabilistic topic modeling algorithm (e.g., latent Dirichlet allocation (LDA)) is used in some embodiments to analyze the corpus. The analysis in some embodiments is described in relation to FIGS. 4A-B. Before the analysis begins, a number of topics to use (e.g., K topics) in the analysis is determined. The number of topics in some embodiments is chosen by a user, while in some embodiments the number of topics is chosen by the process based on the number of documents and words identified. The analysis begins by generating two tables: a word-probability table 410 over the topics and a topic-probability table 420 over the documents. The initial generation of tables 410A and 420A assigns words to topics with a probability distribution and assigns topics to documents with a probability distribution. In some embodiments (as in FIG. 4A), the initial distributions are random distributions while in other embodiments the initial distributions are uniform distributions or some other fixed initial distribution.

The probabilistic topic modeling algorithm in some embodiments then iterates through a series of calculations relating to the probability of generating the documents including the identified words with the identified frequencies (table 310) based on the word-probability composition of the topics (table #410) and the topic-probability composition of the documents (table 420). Tables 410 and 420 are adjusted in each iteration until a sufficiently stable set of probability distributions is achieved in some embodiments. FIG. 4B illustrates a sufficiently stable set of word-probability distributions over the topics (table #410) and topic-probability distributions over the documents. Each topic in some embodiments represents a traffic pattern that the probabilistic topic modeling algorithm has inferred from the corpus. These inferred traffic patterns may represent the traffic pattern associated with a particular application or service or a subset of traffic associated with the particular application or service. The probability distributions of topics over the documents can then be used to evaluate the similarity of different documents (e.g., network addresses or nodes) and identify clusters of similar documents.

Figure 5:
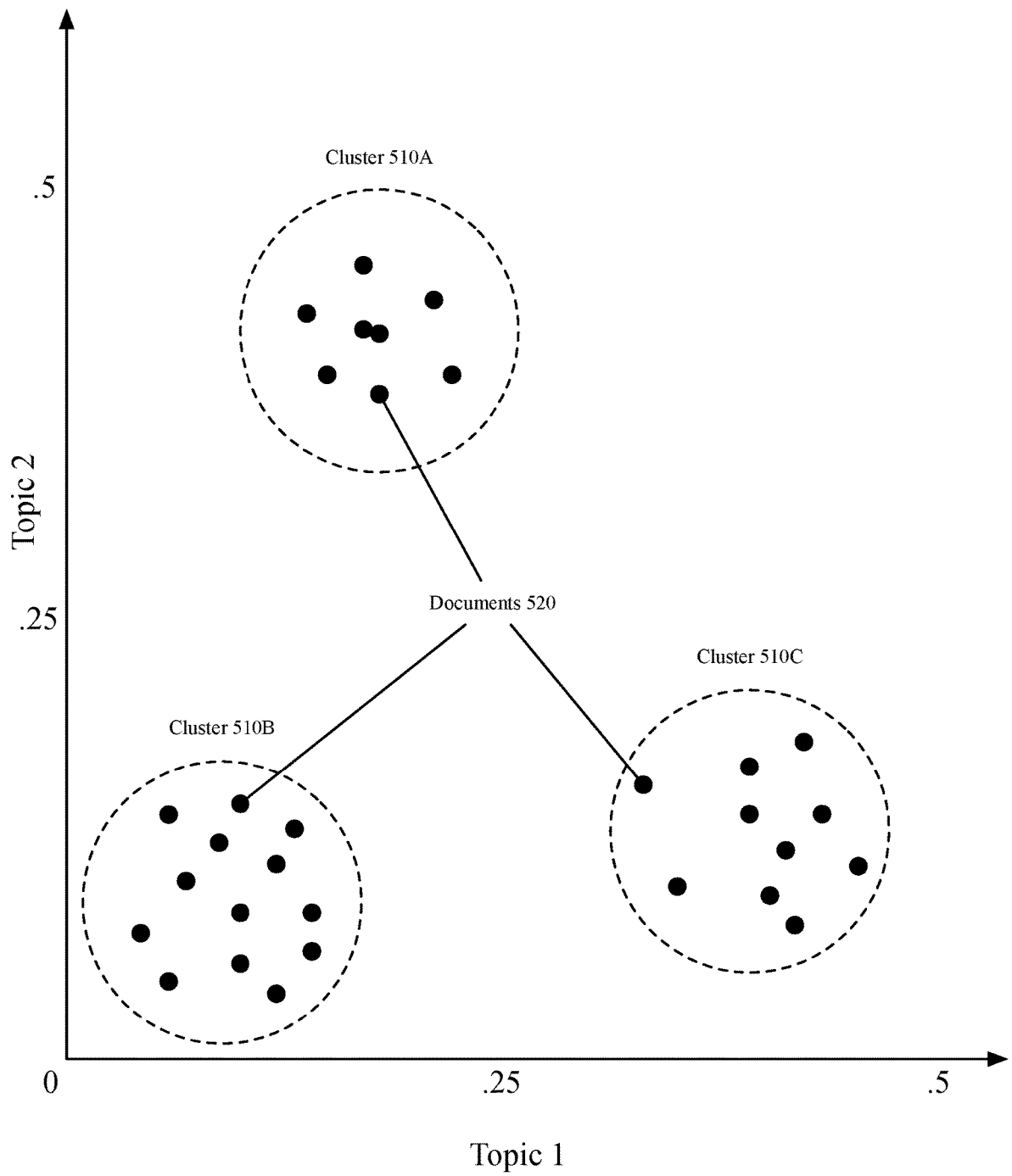
FIG. 5 conceptually illustrates identified clusters of similar documents.

Returning to FIG. 1, once individual network addresses or nodes are associated with probability distributions over the topics (at 140), documents are compared (at 150) to identify document clusters (e.g., network addresses sharing similar traffic patterns as indicated by similar topic-probability distributions). In some embodiments, a clustering algorithm (e.g., k-means clustering) can be applied to identify clusters or groups of network addresses or nodes sharing similar probability distribution over the topics. It is expected that network addresses or nodes (e.g., servers) running the same application will show similar network traffic patterns and therefore have similar probability distribution over the topics. In some embodiments, the clustering algorithm calculates a distance between documents (e.g., using a Jensen-Shannon divergence or distance) to determine clusters of sufficiently-similar documents. A threshold distance is used to determine whether documents are sufficiently similar in some embodiments. The threshold distance may be measured from a centroid, medoid, median, or mean of an identified cluster at each iteration of the clustering algorithm. The calculated distance, in some embodiments, is a measurement of the dissimilarity of topic probability distribution between documents. FIG. 5 provides a graphical representation of "similarity" in a 2-topic space.

FIG. 5 conceptually illustrates identified clusters of similar documents. FIG. 5 shows a 2-dimensional space with each axis representing the probability associated with one of two topics (topic 1 (x-axis) and topic 2 (y-axis)). Documents 520 are plotted based only on the probability of each document's association with the topic, for example a document 520 having a probability associated with Topic 1 of 0.4 and a probability associated with Topic 2 of 0.1 would be plotted at (0.4, 0.1) using Cartesian coordinates. FIG. 5 illustrates three identified clusters (i.e., clusters 510A-C) based on the distribution in this 2-dimensional space. Cluster 510A in this example is correlated to topic 2 with a relatively high probability and to topic 1 with a smaller, but still significant, probability. Cluster 510B in this example is correlated to topics 1 and 2 with a relatively low probability. Cluster 510C in this example is correlated to topic 1 with a relatively high probability and to topic 2 with a smaller, but still significant, probability. In this two-dimensional example, the distance between points in Cartesian space is related to the distance between documents calculated using the clustering algorithm. This simplified example is merely to provide a basic understanding of the process used to determine similarity in the full K-dimensional space. Once clusters have been identified, Process 100 ends. In some embodiments, the identified documents are automatically clustered according to the identified clusters. Process 100 may be run as an initialization process, or may be run as an independent analysis tool (e.g., using timestamp information) to develop knowledge of clusters and network traffic patterns for particular network addresses or nodes over time. In some embodiments, process 100 is followed by process 600 as depicted in FIG. 6.

Figure 6:
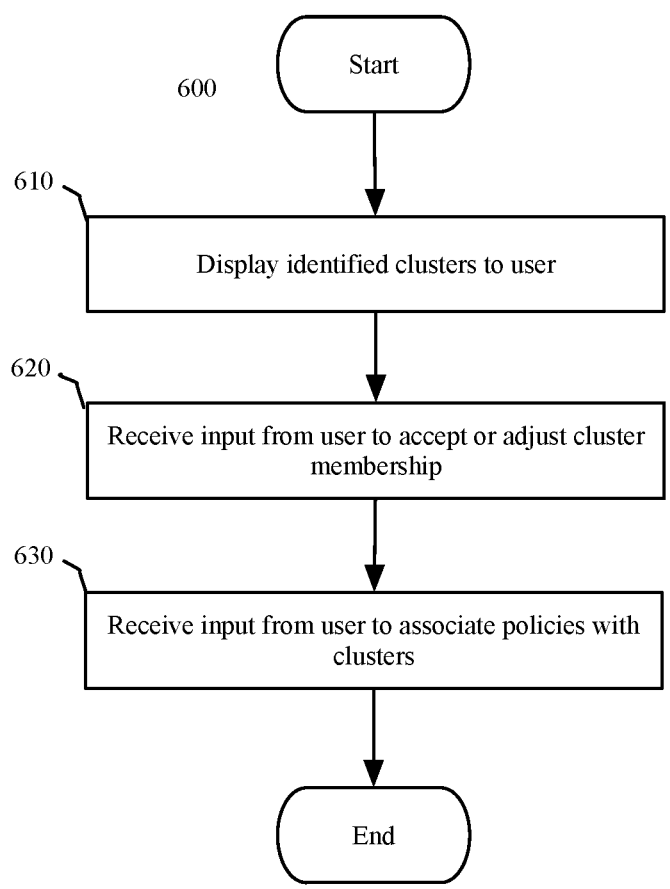
FIG. 6 conceptually illustrates a process for providing identified clusters to a user and receiving input to apply policies.

FIG. 6 conceptually illustrates a process for providing identified clusters to a user and receiving input to apply policies. Process 600 displays (at 610) the identified clusters to a network administrator. In some embodiments, the display is part of a user interface (e.g., a graphical user interface or a command-line interface). A network administrator in some embodiments would review the identified clusters to determine whether they made sense based on his knowledge of the network structure. In some cases, this would be useful to classify network addresses or nodes that were at the boundary of a cluster in the K-dimensional space or to indicate that a given network address or node is not appearing in the expected cluster.

After reviewing the suggested clusters, the process receives (at 620) input from the user to accept or adjust the identified cluster membership. The input in some embodiments changes the number of clusters based on network structure. For example, if two web servers for different internal clients (e.g., divisions or product lines) are placed in a cluster based on the similarity of web server traffic, an administrator may add a separate cluster in which one set of web servers is placed.

After receiving the input (at 620) to accept or adjust the cluster membership, the process receives at (630) input to associate each cluster with a set of policies. In some embodiments, the policies are security policies that are applied based on the applications or services provided by the network addresses or nodes in the cluster. Security policies in some embodiments include any combination of access control lists (ACLs), firewalls, and encryption policies. The process ends and the policies associated with each cluster are applied to the network addresses or nodes for that cluster.

Identified clusters, in some embodiments, correspond to microsegments in a network. A microsegment, as used in this document, refers to a set of compute nodes (e.g., VMs) in a larger network that a user desires to separately protect (e.g., using a distributed firewall applying microsegment-specific firewall rules). In some embodiments, separately protecting microsegments provides additional security against data breaches within a datacenter by not allowing east-west traffic within the datacenter unless it is a trusted communication. Each microsegment may have specific policies that are applicable for the compute nodes in the microsegment but are unnecessary for others. In some embodiments, a microsegment is created or identified for each type of application executing in the logical network. In some embodiments, each tier in a multi-tier application defines a separate microsegment. For example, a multi-tiered application may have a Web tier, an App tier, and a Database (DB) tier that an administrator desires to protect with different firewall rules.

Figure 7:
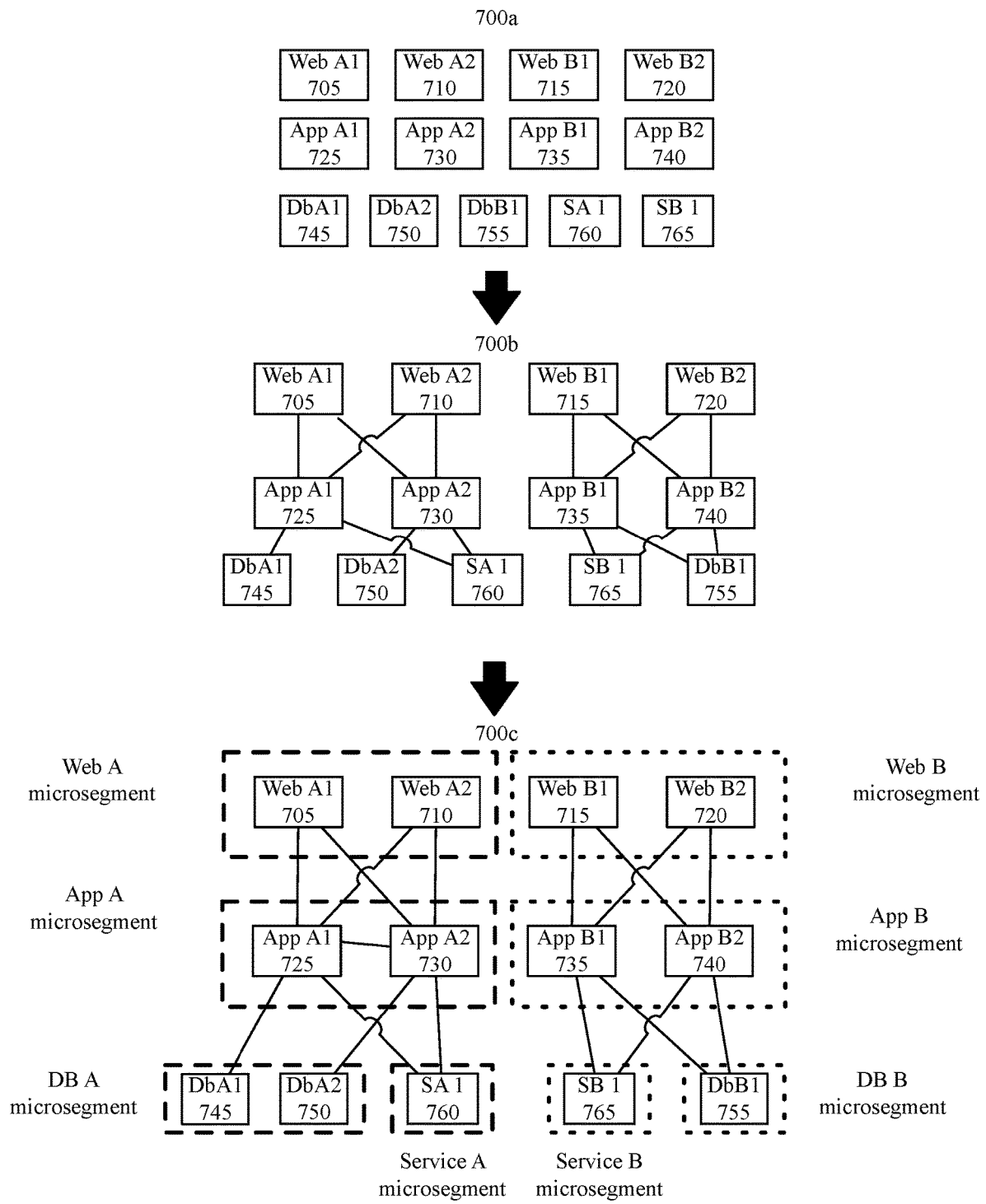
FIG. 7 illustrates an exemplary set of DCNs in different tiers of two multi-tier applications being organized into separate microsegments in three stages.

FIG. 7 illustrates an exemplary set of DCNs 705-765 in different tiers of two multi-tier applications being organized into separate microsegments in three stages. The organization into microsegments, in some embodiments, is based on the processes depicted in FIGS. 1 and 6 discussed above and would occur similarly for multiple applications, each associated with a different "document" (e.g., IP address), executing on a single DCN. FIG. 7 depicts DCNs 705 and 710 executing a first Web tier (Web A) for a first multi-tier application and DCNs 715 and 720 executing a second Web tier (Web B) for a second multi-tier application. FIG. 7 also depicts Application tier DCNs 725-740, Database tier DCNs 745-755, and service DCNs 760-765 (e.g., load balancers) that are each associated with one of the multi-tier applications. However, at stage 700a, the traffic patterns between the different tiers and different applications have not been recorded and no relationship between the different DCNs has been identified.

At stage 700b, flows between different DCNs are recorded and traffic patterns emerge (as conceptually shown by the lines connecting different DCNs in the figure). Each DCN in some embodiments will have its own network (e.g., IP) address that defines a document used to identify clusters as in process 100 of FIG. 1. These traffic patterns can then be used to group the DCNs into clusters as described above in relation to FIGS. 1 and 6.

Once the clusters of similar DCNs are identified each cluster (i.e., microsegment) in some embodiments has a separate set of firewall rules applied. Such firewall rules in some embodiments are based on a positive control model that defines permitted traffic in the network (e.g., implementing a least privilege and unit-level trust model). In some embodiments, firewall rules are based on a negative control model that defines forbidden traffic, but allows all other traffic. Some exemplary firewall rules applicable to microsegments of FIG. 7 include: (1) allowing flows from web DCNs (e.g., servers) to application DCNs, (2) allowing flows from application DCNs to database DCNs, and (3) forbidding (e.g., dropping) flows from a web DCNs to a database DCNs. Other firewall rules are derived based on different application related criteria.

In some embodiments, once the clusters have been defined using process 100 or processes 100 and 600, additional nodes or network addresses that are added to the computer network are added to the identified (or identified and verified) clusters based on a subsequent use of process 100 based on new data that reflect the flows related to the additional network addresses or nodes collected since their addition. The newly added network addresses or nodes in some embodiments have the policies of the cluster applied automatically without needing input from a user.

Figure 8:
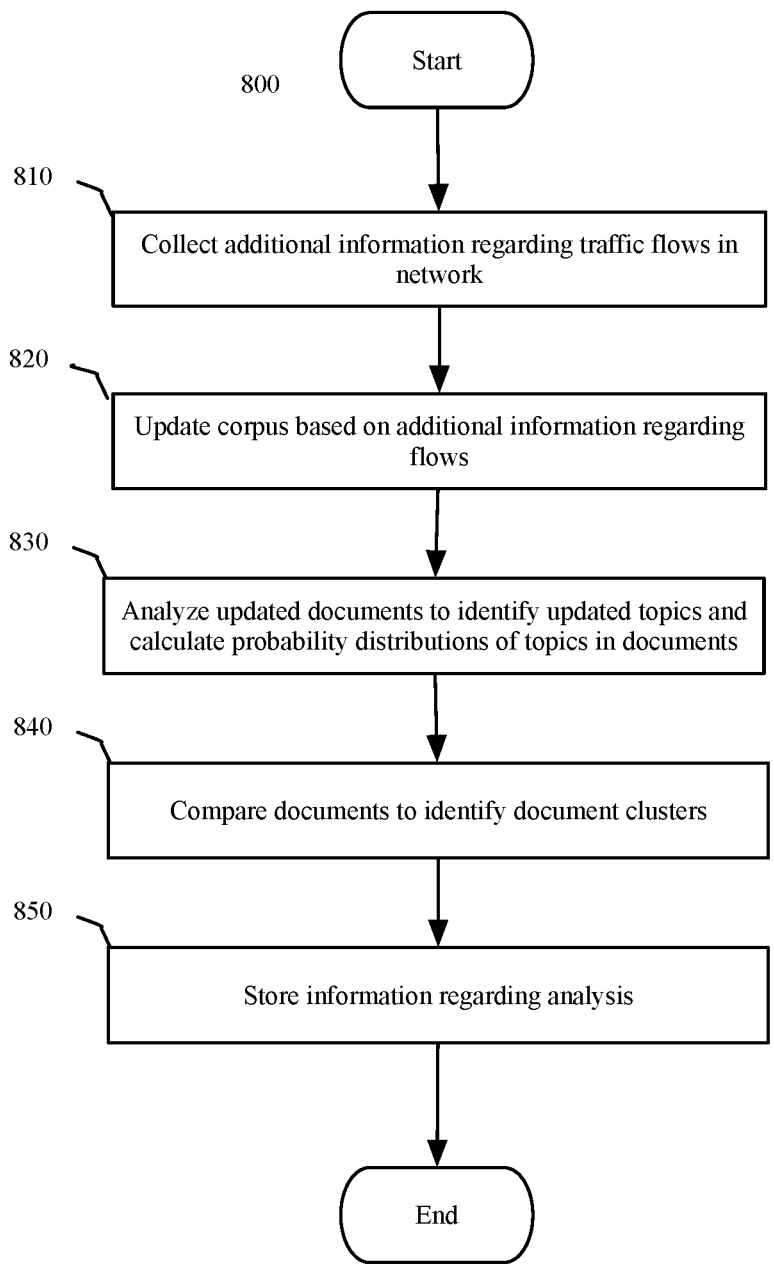
FIG. 8 conceptually illustrates a process for updating the identification of clusters and documents in clusters.

FIG. 8 conceptually illustrates a process 800 for updating the identification of clusters and documents in clusters. The description of process 800 assumes that process 100 (or a similar process for initially identifying clusters) has already been performed. The process 800 in some embodiments is done periodically to update the cluster memberships. Additionally, the process 800 is used in some embodiments to monitor the changes in the cluster memberships and the probability distributions over topics for individual documents over time.

Process 800 begins (at 810) by collecting additional information regarding network traffic. The additional data is collected continuously during certain time periods. In some embodiments, process 800 is run periodically (e.g., every 6 hours) or after the addition of a certain number of network addresses or nodes and the additional information is collected for a limited time (e.g., 1 hour) so as not to produce too big a burden on the network.

The process then analyzes the additional collected information and updates (at 820) the corpus based on the additional collected information. In some embodiments, the collected information includes new "words" or "documents." These new words may relate to newly added network addresses or nodes (new "documents") or may indicate a new type of behavior of existing nodes. In some embodiments, each set of additional collected data is time-stamped to enable a user to define the corpus based on a particular subset of the collected data or to perform multiple analyses based on different combinations of data.

The process then analyzes (at 830) the updated corpus to identify updated topics and calculate the probability distributions over the topics for the updated set of documents. The updated corpus in some embodiments includes all previously collected information. In some embodiments, a subset of collected information is analyzed to determine current probability distributions over the topics for the updated set of documents. The subset of previously collected information of some embodiments is the information collected in the current time period and the immediately prior time period (e.g., if we assume that the current probability distribution depends only on the immediately prior distribution (a Markovian assumption)).

After analyzing (at 830) the corpus, the process compares (at 840) the probability distributions over the topics for the updated set of documents to identify the clusters of similar documents. In some embodiments, the identified clusters are based on the previously-identified cluster. Basing current cluster identification on previously-identified clusters in some embodiments includes comparing the similarity of clusters (e.g., comparing the centroids or medoids of identified clusters in the k-dimensional topic space, or comparing the membership in the previously-identified clusters with the membership of the currently-identified clusters). Correlating previously identified clusters with currently identified clusters in some embodiments allows for application of security policies without further input from a user.

After the clusters are identified based on the updated corpus, the process (at 850) stores information regarding the analysis. In some embodiments, the process stores (at 850) information regarding the cluster to which each document is assigned. The stored information in some embodiments is a set of probability distributions over the topics for each document. The stored information is useful to determine a divergence over time of the application or service provided by the network address or node (as indicated by the probability distribution over topics). Additionally, the stored distributions can be used to detect anomalous behavior.

Figure 9:
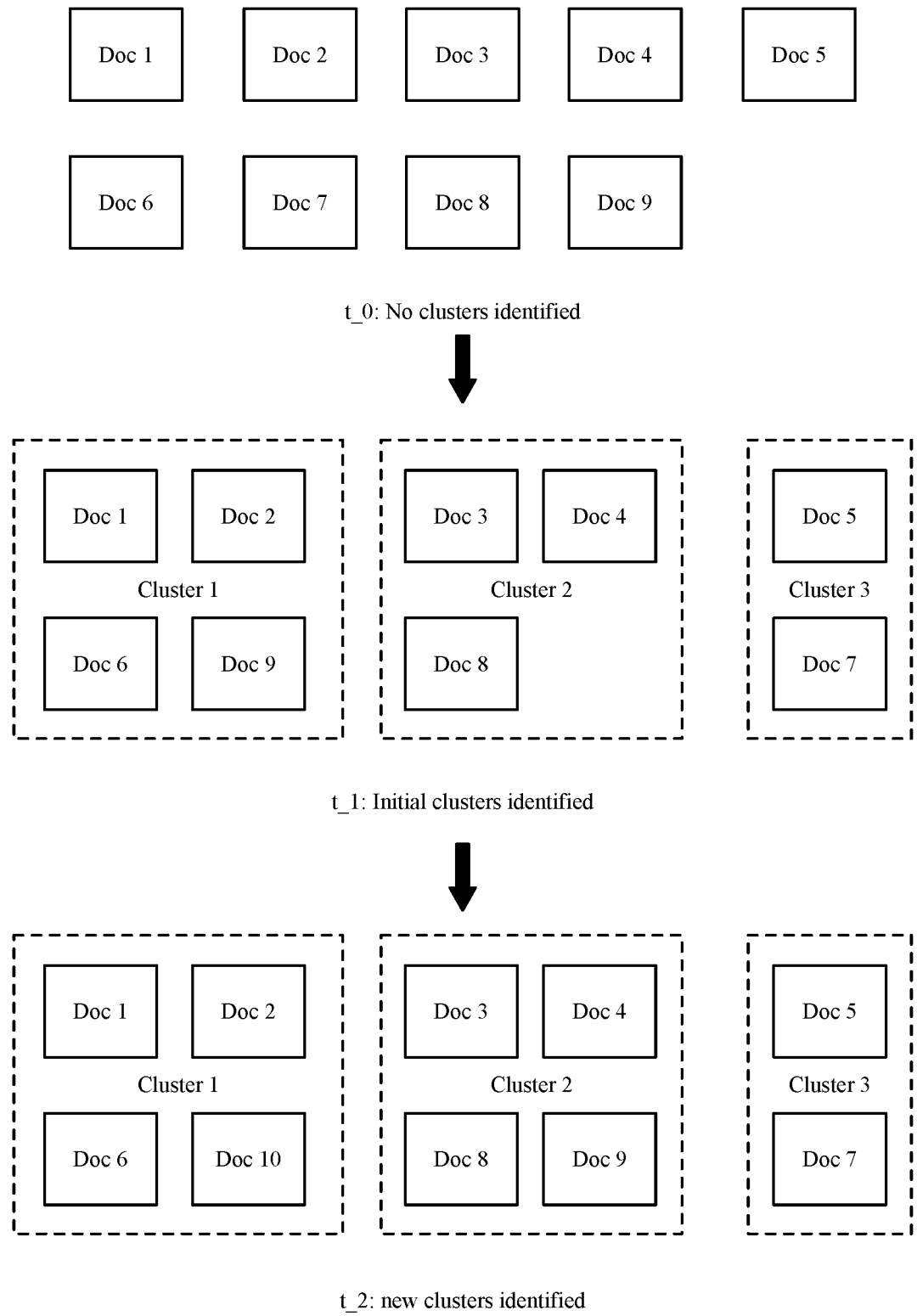
FIG. 9 conceptually illustrates identified clusters of similar documents at different times.

As an example of the results of processes 100 and 800, FIG. 9 conceptually illustrates identified clusters of similar documents at different times. A cluster of documents (Docs 1-9) representing a set of network addresses or nodes are depicted at a first time ($t\_0$) before analysis is performed. Process 100 is performed at a time $t\_1$ and identifies cluster 1 (comprising Docs 1, 2, 6, and 9), cluster 2 (comprising Docs 3, 4, and 8), and cluster 3 (comprising Docs 5 and 7). An additional node or network address is added (represented by Doc 10) between time $t\_1$ and $t\_2$ and process 800 is then performed at $t\_2$. Process 800 identifies newly added Doc 10 as belonging to the cluster 1 and identifies Doc 9 as belonging to cluster 2 instead of cluster 1. As described in relation to FIG. 8, the policies applied to cluster 1 are applied to Doc 10 as a member of cluster 1.

Figures 10, 11:
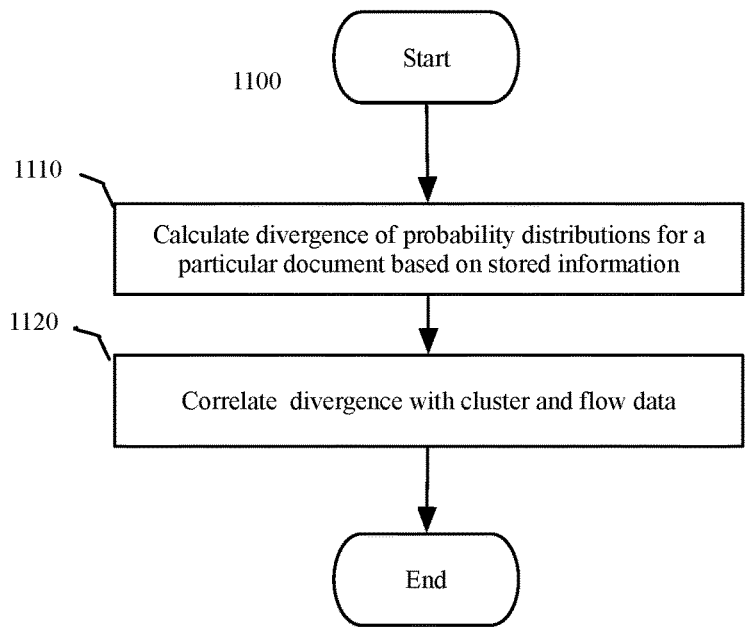
FIG. 10 conceptually illustrates a topic probability table for a single document at different points in time.
FIG. 11 conceptually illustrates a process for monitoring a particular document for changes in behavior over time.

FIG. 10 conceptually illustrates a topic probability table for a single document at different points in time as stored in some embodiments as part of process 800. Temporal Topic Probability Table 1010 illustrates a probability distribution over topics 1-K at times 1-J. In some embodiments, the probability distributions over topics are stored at each iteration of process 800. In other embodiments, the process 100 can be used on the entire corpus of timestamped documents to determine a set of topics and then calculate probability distributions based on the identified topics for each time period of interest (e.g., as defined by a user). An analysis that uses the entire corpus for topic identification removes any confusion that might occur if topics change between time periods based on the different network traffic information collected. Once table 1010 has been constructed an individual network address or node can be analyzed as in process 1100 of FIG. 11.

FIG. 11 conceptually illustrates a process 1100 for monitoring a particular document for changes in behavior over time. Process 1100 starts by calculating (at 1110) the divergence of the probability distributions over topics for a particular document (e.g., network address or node) based on stored information as described above in relation to FIGS. 8 and 10. The divergence in some embodiments is calculated as an information radius (e.g., using a Jensen-Shannon divergence). The divergence in some embodiments is calculated over all the distributions and is divided by the log base 2 of the number of points in time to normalize the result to a range of [0-1], with 0 representing no change and 1 representing maximal change with no correlation between points in time.

The process continues by correlating (at 1120) the divergence with cluster and flow data. In some embodiments, the correlation shows how and why applications change over time. When process 1100 is performed for a plurality of documents, it can show how and why applications change over time within the individual nodes as well as the cluster of nodes. For example, a web server may begin serving a different type of document or a particular document may be requested by clients more often and skew the probability distribution towards the topic that is more closely related to that type of flow. The process then ends.

Once the divergence is correlated with cluster and flow data, the correlation is used in some embodiments to determine that a network address or node is behaving anomalously. Once anomalous behavior has been detected a network administrator can take appropriate remedial action. Referring to table 1010 of FIG. 10, it can be seen that at time 4 the document (e.g., network address or node) has a very different probability distribution over the topics. This may indicate a type of denial of service attack that skews the traffic towards a particular set of files or flows. The anomaly detection is inherently application-centric and thus more accurate than a method that identifies outliers in basic metrics such as traffic volume or burstiness. This accuracy generates less false positives and makes it easier to find actual anomalies among the identified possibilities.

Figure 12:
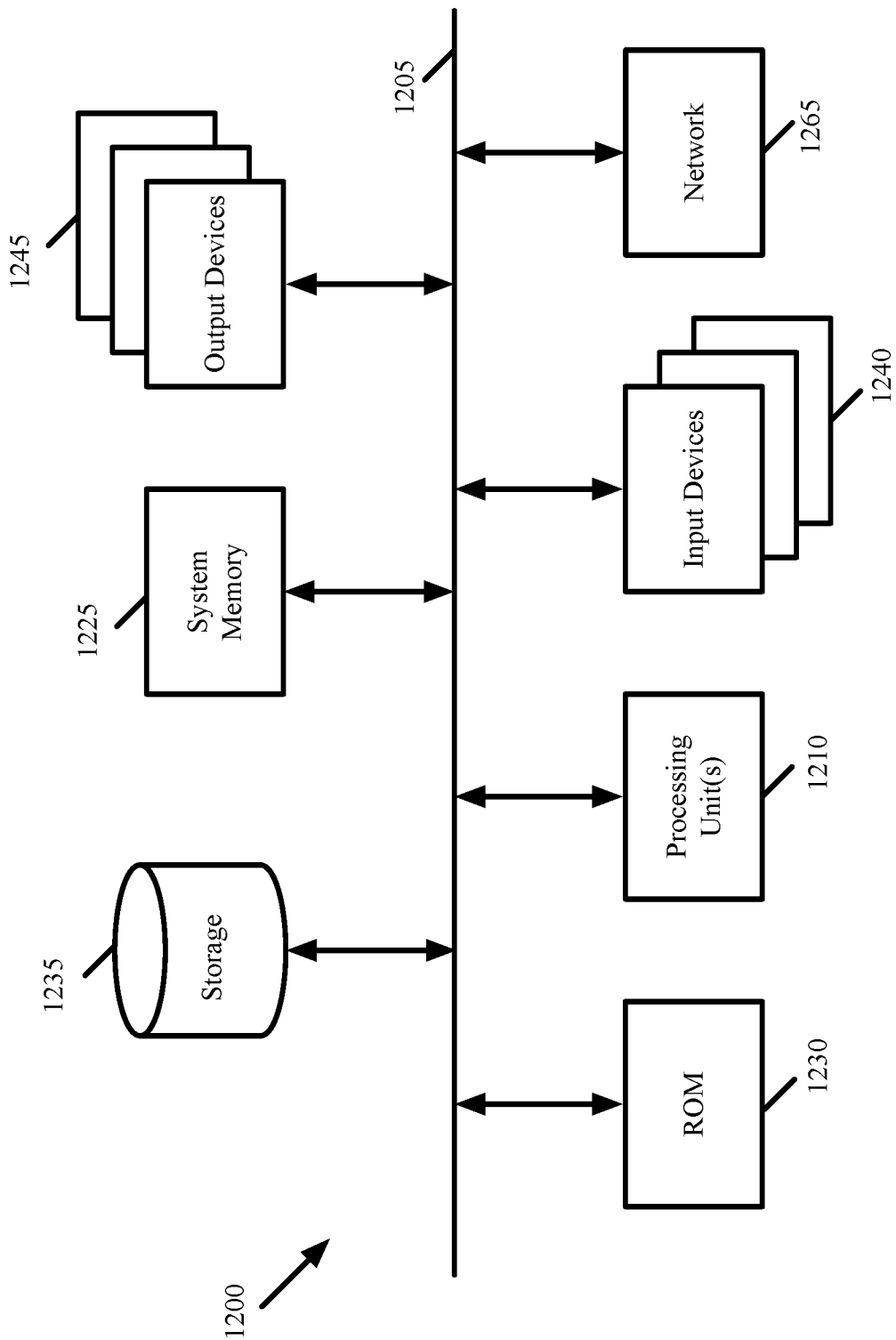
FIG. 12 conceptually illustrates an electronic system with which some embodiments of the invention are implemented.

FIG. 12 conceptually illustrates an electronic system 1200 with which some embodiments of the invention are implemented. The electronic system 1200 can be used to execute any of the control, virtualization, or operating system applications described above. The electronic system 1200 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1200 includes a bus 1205, processing unit(s) 1210, a system memory 1225, a read-only memory (ROM) 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieve instructions to execute and data to process in order to execute the processes of the invention. The processing unit(s) may be a single processor or a multi-core processor in different embodiments.

The read-only-memory 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash drive, etc.) as the permanent storage device. Like the permanent storage device 1235, the system memory 1225 is a read-and-write memory device. However, unlike storage device 1235, the system memory is a volatile read-and-write memory, such as random access memory. The system memory stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieve instructions to execute and data to process in order to execute the processes of some embodiments.

The bus 1205 also connects to the input and output devices 1240 and 1245. The input devices enable the user to communicate information and select commands to the electronic system. The input devices 1240 include alphanumeric keyboards and pointing devices (also called "cursor control devices"). The output devices 1245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 12, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host machine using resources of the host machine virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 4 and 5) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for detecting anomalies in traffic patterns related to a first network address associated with an element in a computer network, the method comprising:
   during each of a plurality of time periods, analyzing network traffic characteristics for traffic relating to the first network address to create a probabilistic distribution for flows that start or end at the first network address;
   comparing the probabilistic distributions of the flows that are created for the plurality of time periods to identify at least one particular time period that has a particular probabilistic distribution of flows that diverges from other probabilistic distributions created for other time periods; and
   identifying the particular time period for a network administrator to analyze in order to identify a source for an anomalous event that has caused the particular probabilistic distribution to diverge.

2. The method of claim 1, wherein
   analyzing network traffic characteristics comprises using a probabilistic topic modeling algorithm to generate a plurality of probabilistic distribution of topics for a plurality of documents;
   said modeling comprising defining sets of flows as topics and sets of network addresses as documents;
   each probabilistic distribution of topics produced by the modeling representing a distribution of sets of flows for the network address associated with the probabilistic distribution.

3. The method of claim 1, wherein a plurality of flows starts or terminates on compute nodes that are part of one or more compute clusters, the method further comprising, before identifying the particular time period,
   using data regarding membership of one or more compute clusters to assess whether the identified divergence of the particular probabilistic distribution corresponds to a change in the membership of a cluster; and
   identifying the particular time period when the identified divergence does not correspond to a change in the membership of a cluster.

4. The method of claim 3, wherein the compute nodes comprise virtual machines or containers.

5. The method of claim 1,
   wherein a plurality of flows starts or terminates on compute nodes that are part of one or more compute clusters,
   wherein analyzing network traffic characteristics comprises:
   identifying a plurality of clusters of compute nodes;
   providing recommendations for specifying microsegmentation service rules for each of the clusters; and
   for each accepted recommendation, assigning the microsegmentation service rules associated with the recommendation to the cluster for which the recommendation is provided.

6. The method of claim 1 further comprising:
   during each of the plurality of time periods, analyzing network traffic characteristics for traffic relating to a second network address to create a probabilistic distribution for flows that start or end at the second network address;
   comparing the probabilistic distributions of the flows that are created for the plurality of time periods related to the second network address to identify at least a second particular time period that has a second particular probabilistic distribution of flows related to the second network address that diverges from other probabilistic distributions related to the second network address created for other time periods; and
   identifying the second particular time period for a network administrator to analyze in order to identify a source for an anomalous event that has caused the second particular probabilistic distribution to diverge.

7. The method of claim 1, wherein a plurality of flows are associated with applications that are part of one or more application clusters, the method further comprising, before identifying the particular time period,
   using data regarding membership of one or more application clusters to assess whether the identified divergence of the particular probabilistic distribution corresponds to a change in the membership of a cluster; and
   identifying the particular time period when the identified divergence does not correspond to a change in the membership of a cluster.

8. The method of claim 1, wherein analyzing network traffic comprises analyzing a plurality of stored flow records created during the plurality of time periods.

9. The method of claim 1, wherein at least two time periods have two different durations.

10. The method of claim 1, wherein each time period has a duration that is set by the network administrator.

11. The method of claim 5, wherein a microsegment recommendation made for one time period after a first time period is based on data collected during the particular time period and a set of previous time periods.

12. A non-transitory machine readable medium storing a program for execution by at least one processing unit, the program for detecting anomalies in traffic patterns related to a first network address associated with an element in a computer network, the program comprising sets of instructions for:
during each of a plurality of time periods, analyzing network traffic characteristics for traffic relating to the first network address to create a probabilistic distribution for flows that start or end at the first network address;
comparing the probabilistic distributions of the flows that are created for the plurality of time periods to identify at least one particular time period that has a particular probabilistic distribution of flows that diverges from other probabilistic distributions created for other time periods; and
identifying the particular time period for a network administrator to analyze in order to identify a source for an anomalous event that has caused the particular probabilistic distribution to diverge.

13. The non-transitory machine readable medium of claim 12, wherein
analyzing network traffic characteristics comprises using a probabilistic topic modeling algorithm to generate a plurality of probabilistic distribution of topics for a plurality of documents;
said modeling comprising defining sets of flows as topics and sets of network addresses as documents;
each probabilistic distribution of topics produced by the modeling representing a distribution of sets of flows for the network address associated with the probabilistic distribution.

14. The non-transitory machine readable medium of claim 12, wherein a plurality of flows starts or terminates on compute nodes that are part of one or more compute clusters, the method further comprising, before identifying the particular time period,
using data regarding membership of one or more compute clusters to assess whether the identified divergence of the particular probabilistic distribution corresponds to a change in the membership of a cluster; and
identifying the particular time period when the identified divergence does not correspond to a change in the membership of a cluster.

15. The non-transitory machine readable medium of claim 14, wherein the compute nodes comprise virtual machines or containers.

16. The non-transitory machine readable medium of claim 12,
wherein a plurality of flows starts or terminates on compute nodes that are part of one or more compute clusters,
wherein analyzing network traffic characteristics comprises:
identifying a plurality of clusters of compute nodes;
providing recommendations for specifying microsegmentation service rules for each of the clusters; and
for each accepted recommendation, assigning the microsegmentation service rules associated with the recommendation to the cluster for which the recommendation is provided.

17. The non-transitory machine readable medium of claim 12 further comprising:
during each of the plurality of time periods, analyzing network traffic characteristics for traffic relating to a second network address to create a probabilistic distribution for flows that start or end at the second network address;
comparing the probabilistic distributions of the flows that are created for the plurality of time periods related to the second network address to identify at least a second particular time period that has a second particular probabilistic distribution of flows related to the second network address that diverges from other probabilistic distributions related to the second network address created for other time periods; and
identifying the second particular time period for a network administrator to analyze in order to identify a source for an anomalous event that has caused the second particular probabilistic distribution to diverge.

18. The non-transitory machine readable medium of claim 12, wherein a plurality of flows are associated with applications that are part of one or more application clusters, the method further comprising, before identifying the particular time period,
using data regarding membership of one or more application clusters to assess whether the identified divergence of the particular probabilistic distribution corresponds to a change in the membership of a cluster; and
identifying the particular time period when the identified divergence does not correspond to a change in the membership of a cluster.

19. The non-transitory machine readable medium of claim 12, wherein analyzing network traffic comprises analyzing a plurality of stored flow records created during the plurality of time periods.

20. The non-transitory machine readable medium of claim 12, wherein at least two time periods have two different durations.

* * * * *